United States Patent

[11] 3,594,648

| [72] | Inventor | Richard A. Rappaport |
| | | Henrietta, N.Y. |
| [21] | Appl. No. | 696,049 |
| [22] | Filed | Jan. 5, 1968 |
| [45] | Patented | July 20, 1971 |
| [73] | Assignee | Sybran Corporation |

[54] PROGRAMMED PULSE SWITCH AND CONTROL SYSTEM HAVING SAME
14 Claims, 2 Drawing Figs.

[52] U.S. Cl. ................................................ 328/48, 328/129, 307/218
[51] Int. Cl. ................................................ H03k 21/32
[50] Field of Search ........................................ 328/48, 129, 153; 307/218

[56] References Cited
UNITED STATES PATENTS

| 2,519,184 | 8/1950 | Grosdoff | 328/48 |
| 2,851,596 | 9/1958 | Hilton | 328/48 |
| 3,241,017 | 3/1966 | Madsen et al. | 328/48 X |
| 3,404,343 | 10/1968 | Strand | 328/48 X |
| 3,226,568 | 12/1965 | Samwel | 307/218 |

Primary Examiner—John S. Heyman
Attorneys—Peter J. Young, Jr. and Joseph C. MacKenzie ABSTRACT: A first flip-flop, on being set enables gating a pulse train to a second flip-flop, and the second flip-flop enables gating the pulse train to a counter. The counter is set to emit a control signal upon counting the $n$th pulse of a predetermined number, $n$, of pulses. A third flip-flop has its set output connected to the direct clear inputs of the other flip-flops, and it set input connected to receive he control signal. Since the second flip-flop flips on the trailing edge of a pulse, the counter begins its count on a whole pulse. The control signal disables the gating to the counter, when it sets the third flip-flop. Accordingly, what it gates to the counter is $n$ whole pulses, these whole pulses being also gated to set point changing means, or the like.

PROGRAMMED PULSE SWITCH AND CONTROL SYSTEM HAVING SAME

It is often useful to provide signals in the form of a train of pulses of predetermined number. For example, in process control systems a valve or other control device is operated by automatic control apparatus to maintain the temperature of a process at a predetermined value, often called the set point. What the valve does to the process is dependent on, among other things, the relation of the actual temperature being controlled to this set point, and the automatic control apparatus, in operating the valve, in essence, measures the difference between actual temperature and set point and takes such difference into account when operating the valve Thus, if the temperature under control results from the burning of fuel under control of the valve, the automatic control apparatus will in turn control the valve in such manner that the rate at which fuel is burned increases and decreased as the temperature under control decreases and increases, respectively.

It is often desired to change the set point, so the automatic control apparatus normally includes means for so doing, and frequently this means is motor operated. The present invention is concerned with operating motive means of this sort wherein the motive means is pulse actuated, i.e., of digital nature, so that it is necessary to provide some means of supplying the desired number of pulses to the motive means, wherein the number of pulses is proportional to the desired set point change. In the present invention, a programmed pulse switch is provided for this purpose. The programmed pulse switch includes a pulse generator capable of producing a train of pulses of any desired length, a counter that counts said pulses and can be set to produce a control signal upon the occurrence of some preselected desired number of pulses, and logical circuitry interconnecting generator and counter and of such sort as to assure that precisely and only the said number of whole pulses is produced by the programmed pulse switch, upon command. By programmed is meant that the desired number, $n$, say, is set or programmed into the counter, so that when the logical circuitry is put into operation, $n$ pulses are automatically produced. These pulses, of course, are thereby made available to suitable utilization apparatus such as the pulse-operated set point changing motive means previously referred to. Preferably, the logical circuitry is arranged so that it must be reset independently before another group of output pulses can be generated into the utilization apparatus.

Figures 1, 2:
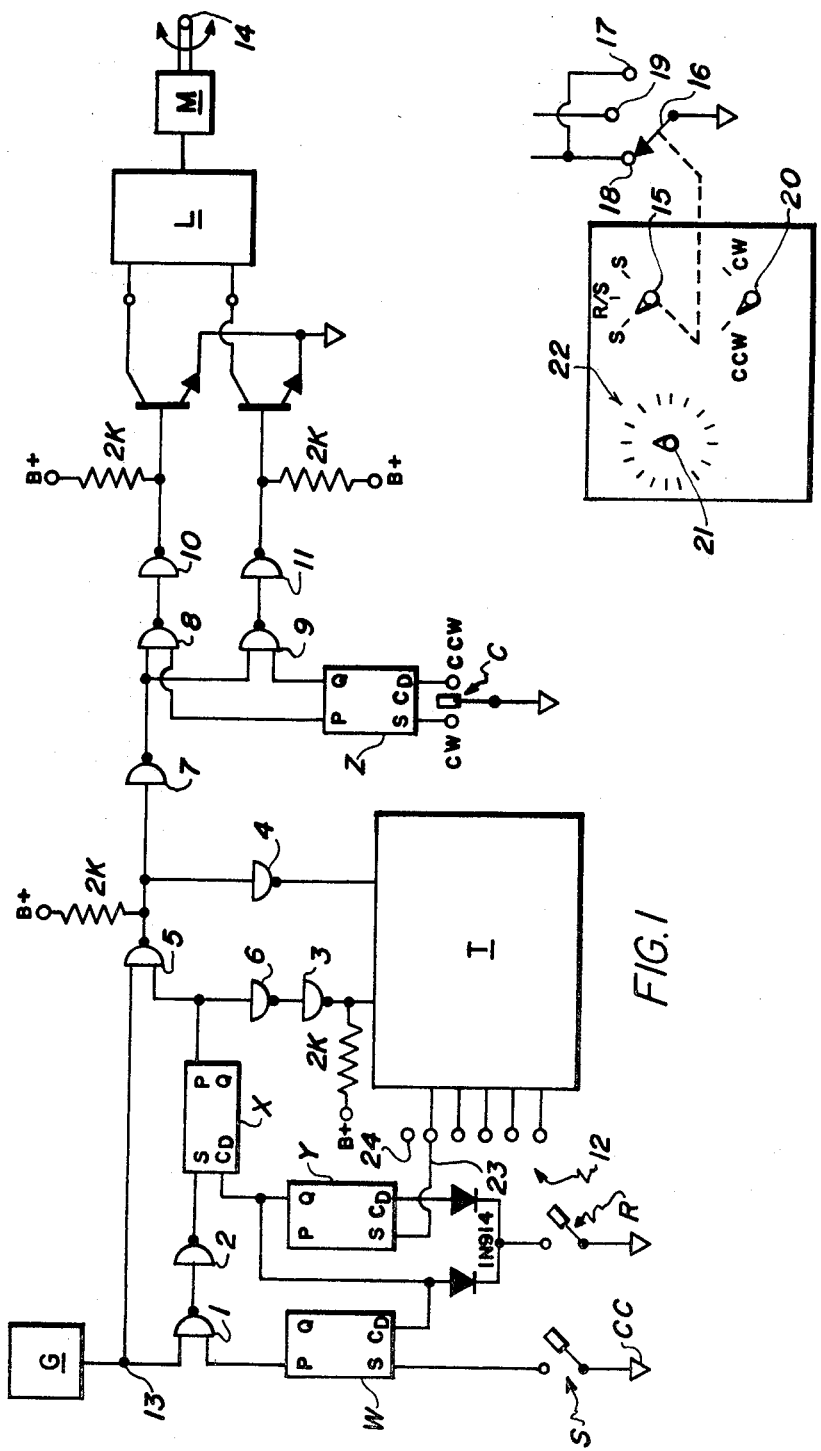
FIG. 1 is a block diagram of a programmed pulse switch according to the invention, particularly adapted for operating the motive means for changing set point of a process control apparatus.
FIG. 2 is a diagram of a typical control panel scheme for the system shown in FIG. 1.

In FIG. 1, the entities identified by reference numerals 1 through 11 are gates of conventional type, as, for example, Motorola MC844P two-gate chips provide ages 3, 5, 10 and 11, and the others are provided by Motorola MC846P four-gate chips. Reference characters W, X, Y and Z identify Motorola MC845P flip-flops. On the flip-flops, reference characters $s$, $c$, P and Q denote the usual set input, direct-clear input, set output and clear output, respectively, of the flip-flops. Each of these flip-flops have the characteristic that if either of its inputs is grounded, then on grounding, the corresponding output will produce an off-ground voltage and the other output will go to ground, unless the outputs are already in that condition. That is to say, if the flip-flop "flips," on grounding, then it cannot flip again, until its other output is grounded to "flop" it, so to speak. Further, if the specified flip-flop has both inputs grounded simultaneously, its P output remains at ground or is driven there if it happens to be off ground at the moment of grounding.

The gates 1, 5, 8 and 9, on the other hand, disable on grounding, and enable on an off-ground voltage. The other gates are always enabled and are provided for either their inverting property (necessary to keep signal phase straight) and/or for power gain (counter I has relatively large power requirements for resetting).

It will be observed, too, that gates 1 and 5 are enabled from the P-outputs of flip-flops W and X, respectively, that gates 8 and 9 are enabled by the P- and Q-outputs, respectively, of flip-flop Z.

The several resistances (2 kilohm) and B+'s (5—7 volts DC) circuit commons or grounds (inverted triangles, one being provided with the reference character CC for purpose of example), and the diodes (1N914), are provided for the usual reasons.

Reference numeral 13 indicates the point at which the pulses to be programmed are applied to the system, as by a pulse generator G. While the present use of the system envisages pulse rates of 100 per second, the speed at which the specified gates and flip-flops act is fast enough that the system will program pulses generated at rates up to several megacycles per second. The pulses for present purposes are considered to be generated continuously, uniformly spaced and positive, going from ground to 5—7 volts and back to ground.

Reference character S denotes a start switch, by which flip-flop W's set input can be connected to circuit common, and is preferably a momentary closeable switch, since once the programmed pulses are started, the switch S may be opened. Reference character R denotes a similar switch, which serves for connecting the direct-clear inputs of the flip-flops to circuit common and, like switch S, may be a momentarily closeable switch. No particular means for energizing generator G and starting it are shown, and if desired, it could be arranged to start it by closing switch S. In any event, it is to be assumed that whenever switch S is closed, that there are pulses from generator G at junction 13 and being applied to gates 1 and 5.

The pulse input to the counter T is via gate 4, and the counter's output, a ground generated upon attainment of predetermined count, is applied to the set input of flip-flop Y, and provides a control signal, in effect, for stopping the gating of pulses to whatever means the programmed pulse switch is supplying pulses, in this case, a dual channel circuit with buffer transistors T at whose collectors, depending on the setting of a channel selector switch C, pulses appear. Thus, if switch C is set at CW, the upper transistor T passes the pulses, whereas if the switch C is set at CCW, the lower transistor T passes the pulses. The symbols CW and CCw may be understood as clockwise and counterclockwise, for the motive means M for changing set point, shown as connected to the transistors, via a logic circuit L, frequently has an effective output in the form of a shaft 14, which moves clockwise in response to upper-transistor pulses, and counterclockwise, as indicated by the arcuate arrow shown about the shaft 14, in response to lower-transistor pulses.

The logic circuit L is simply a means for gating power to the motive means M, in accordance with the relatively low power information in the pulses provided by the programmed pulse switch. The details of such circuitry are not relevant to the programmed pulse switch, and numerous varieties thereof are found in the prior art, so it will not be further disclosed here.

The counter T is of the type which could not be depended on to distinguish between a fractional pulse and a whole pulse. The means utilizing the pulse, such as logic circuit L, will often be such as to require a whole pulse for proper operation.

Accordingly, it is necessary to delay application of pulses to gate 7 until it is assured that the first pulse is a full one and is also the first one counted by the counter T, which comes about as follows:

To begin with, suppose flip-flops W, X and Y to have been rest, as by momentarily grounding their direct-clear inputs by means of the reset switch R, and the generator to be continuously producing identical pulses, one after the other. At this time, gate 5 is disabled since flip-flop X is producing no off-ground enabling signal at its P-output. Likewise, gate 1 is disabled in similar fashion. Now the startswitch S is closed momentarily to ground the set input of flip-flop W, thereby turning on an enabling signal to gate 1 from the P-output of flip-flop W. Pulses now pass gates 1 and 2 to the set input of flip-flop X. The trailing edge of the first such pulse causes the flip-flop X to turn on its P-output, thereby enabling gate 5, so that it gates the very next pulse to both gates 4 and 7. (It is to be noted that the roles of gates 2 and 4 are simply to provide inversions countering the inversions of gates 1 and 5. Thus, gates 1 and 2 define in effect a single, noninverting gate, as do gates 5 and 4.)

The last-mentioned pulse is the first counted by the counter T and the first to be applied to gate 7, since switch S started the system up. When the number of pulses passing through gate 5 has reached the predetermined number, say $n$, to be counted, the pulse counter T produces a control signal at the set input of flip-flop in response to the $n$th pulse passing gate 5 since the start switch S was operated. This sends the Q-output of flip-flop Y to ground, thereby resetting the P-output of flip-flop X to ground, so as to disable gate 5 before the $(n+1)$th pulse can be gated, thereby stopping the programmed pulse switch. This stopping action occurs even if switch S is still closed, as it may well be for small $n$ and/or high pulse rates, making it impossible to start the programmed pulse switch until after it is reset by closing switch R, momentarily.

Since flip-flop X did not flip until the trailing edge of the first full or partial pulse gated to its set output, gate 5 first passed an off-period of the pulse signal to the counter T, before any pulse, and thereby assured that the first pulse counted by counter T was a full pulse. Flip-flop X, therefore, has acted to delay gating of pulses for precisely the duration of the first pulse applied thereto, whether a full pulse or a partial pulse. The gates, on the other hand, enable and disable instantaneously, in effect, as compared to the flip-flop action time.

In the dual channel circuitry, gate 7 defines with gate 5, another noninverting gate, as do gates 8 and 10, and gates 9 and 11, respectively. The dual channel circuitry may vary considerably according to what the dual output is to be used for. The circuitry shown, including the transistors, reflects the particular use of driving a logic circuit suitable for stepping motor of about 35 volt-ampere rating, driving a potentiometer slider, mechanical indicator or the like, wherein each step represents a change in resistance or of indication, on the order of 0.05 percent of total resistance, or of indication range.

The nature of counter T depends on the pulse rate, and for relatively low rates could be electromechanical. It is preferable, however, to use a fully electrical device such as a so-called "time slot generator," or the like, which is essentially a binary counter plus such logical circuitry as is needed to gate a control signal to the appropriate contact of a multiposition switch upon attainment of a pulse count corresponding to the setting of the multiposition switch. These devices are vacuum tube or solid-state circuits capable of counting at rates measured in megacycles per second and though such capability is not required for used such as set point changing by stepping motor devices (which operate much below megahertz rates), are for various reasons preferable to electromechanical counting devices.

The counter T may be supposed to have a plurality of outputs, as indicated by output terminals 12, those shown being purely exemplary as to number. The set input of flip-flop Y is connected to whichever output the control signal appears at when the $n$th pulse is counted. Obviously, for a wide range of values of $n$, a greater number of outputs may be provided, though, of course, the actual number of terminals 12 can be made far fewer than there are choices of $n$, by using decade-type output selecting in the counter T.

FIG. 2 illustrates a typical control panel for the system of FIG. 1. Here, the switches S and R are replaced by a three position switch having a knob 15 for positioning the movable contact 16 of the switch to one or another of fixed contacts 17, 18 and 19. Contacts 17 and 18 are connected to the set input of flip-flop W, and therefore when contact 16 makes one or the other of contacts 17 and 18, the selected pulse program started. On the other hand, contact 19 is connected by the diodes of FIG. 1 to the direct clear inputs of the flip-flop, so when it is made by contact 15 the system resets ready for another start. It will also be noticed that if pulses are being gated when contact 19 is made, they will be stopped. The switching, therefore, provides starting, resetting and stopping, as indicated by the symbols R, R/S and S on the panel. If the stop faculty is not needed, the diodes can be omitted and the direct clear input of the flip-flop Y connected to contact 19, so that flip-flops W and X can be reset only from the Q output of flip-flop Y.

A knob 20 and the legends CW and CWW corresponds to the channel switch C of FIG. 1, and the knob 21 and a scale 22 stand for a multiposition switch (not shown) corresponding to the outputs 12 of FIG. 1. Thus, turning knob 21 corresponds to moving the connection 23 of the set input of flip-flop Y from one output 12 to another output 12. Preferably, a connectionless position of the multiposition switch is provided, corresponding to the connectionless terminal 24 of FIG. 1. This particular position is "continuous," since once the pulses begin to be gated, no stopping control signal is available from counter T to shut the pulses off if connection 23 is on terminal 24.

The pulse-programming action of the system of FIG. 1 is useful wherever it is desired to dispense, so to speak, an exact predetermined number of whole pulses. The trailing-edge responsive action of flip-flop X basically assures this result. In addition, the priority of direct-clear input over set input, which is characteristic of the flip-flop specified for X assures that simultaneous occurrence of pulses at both inputs of flip-flop X never results in gate 5 enablement. The direct-clear signal to flip-flop X appears at its direct-clear input following the last pulse to be counted, since there is obviously a certain time interval required for the $n$th pulse to be counted to result in disablement of gate 5. However, because of this priority property of flip-flop X, the design of the circuitry involved can allow the possibility of such time interval being as long as the space between pulses. Finally, because the flip-flops do not respond to repeated pulsing of the same input, "contact bounce," a frequent occurrence in mechanical switching, cannot interfere with operation of the system (although it would be a possibility for small enough $n$, but for the need to reset the system by means of switch R).

While a particular manufacturer's gates and flip-flops have been disclosed herein, the system is not dependent on these. Transistors vacuum tubes, and even electromechanical devices can be used to construct gates and flip-flops having the disclosed functional characteristics. However, in the present state of the art, solid-state devices, in either discrete or integrated circuit form are preferred for speed, reliability, compactness, and so on.

In certain of the claims hereinbelow, the term "flip-flop" is used. In order to avoid cumbersome antecedent verbiage, a flip-flop is to be understood as including a set input, a direct-clear input and the respective corresponding P-output and Q-output respectively and as having the characteristic bistable property of interchanging output signal levels in response to input signal applied to the appropriate input, and of maintaining such levels until input signal is applied to the other input.

It is to be understood that the invention disclosed herein is to many used and modifications, which will nonetheless come within the scope of the claims appended hereunto,

I claim:

1. A programmed pulse switch comprising a pulse source having an output at which appears a train of pulses, wherein said train constitutes alternate on-and-off periods of a signal; a pulse counter, and start/stop circuitry, said start/stop circuitry being actuable to a start condition and, alternately to a stop condition, said circuitry, upon actuation to said start condition, being responsive solely to an ending on-period of said signal to apply said signal, in its next following off-period, to said pulse counter; said pulse counter; being responsive to said signal to count pulses in the form of on-periods of said signal applied thereto immediately following said off-period, said pulse counter being settable to produce a control signal upon counting an arbitrary predetermined number of the last said pulses; said start/stop circuitry being responsive to said control signal to prevent the on-period of signal next following the last of said predetermined number of pulses from being counted by said pulse;

said start/stop circuit including an "and" gate requiring two, like, input pulses for enablement and applying said signal to said counter, said gate being connected to said pulse source for receiving said ending on-period as one said input pulses;

said start/stop circuitry including means connected to said gate for providing the other said input pulse, in the form of a signal level change like a said on-period, said means being actuable independently of said stop/start circuitry for producing said level change stepwise and continuously until said control signal is produced, said means being effectively connected to said counter to receive said control signal and being responsive to said control signal to reverse said level change whereby to disable said gate.

2. In combination with the programmed pulse switch of claim 1, pulse-actuated motive means of a controller for controlling a process with respect to a predetermined control point, said motive means being constructed and arranged for changing said control point in response to pulses of signal applied to said motive means, and in proportion to the number of said pulses applied to said motive means; said start/stop circuitry of said programmed pulse switch being arranged to apply the pulses applied to said pulse counter to said motive means, and to prevent pulses from being applied thereto when in its said stop condition.

3. The invention of claim 2, including a pair of channels via which said pulses applied to said pulse counter are also applied to said motive means under control of said start/stop circuitry, means for selecting one or the other only of said channels for applying the last said pulses to said motive means; one of said channels being arranged to cause the pulses applied via it to said motive means to have a sense opposite to the sense of pulses applied via the other of said channels to said motive means, and said motive means being constructed and arranged to change said control point in a sense corresponding to the pulses applied to said motive means.

4. The invention of claim 2, including a pair of channels via which said pulses applied to said pulse counter are also applied to said motive means under control of said start/stop circuitry, means for selecting one or the other only of said channels for applying the last said pulses to said motive means, and said motive means being constructed and arranged to change said control point in a sense corresponding to the channel via which pulses are applied to said motive means.

5. A programmed pulse switch comprising, a first flip-flop, a first gate means connected to the P-output of said first flip-flop for enabling of said first gate means, a second flip-flop and second gate means, the set input of said second flip-flop being connected to said first gate means to be set by signal received via said first gate means when the same is enabled, said second gate means being connected to the P-output of said second flip-flop for enabling of said second gate means, said first gate means being connected to a continuous pulse generator for receiving said signal in the form of pulses therefrom and applying said pulses, when enabled, to said set input of said second flip-flop, said second gate means being connected to said continuous pulse generator for gating pulses therefrom, when said second gate means is enabled, a third gate means and a pulse counter, said third gate means being connected to said second gate means to be enabled by said pulses when said second gate means is enabled, said third gate means applying said pulses to said pulse counter when said third gate means and said second gate means are both enabled, said pulse counter being responsive to the first pulse following enabling of said second and third gate means to count the last said pulses and the next pulses following it, said pulse counter being settable to generate a control pulse in response to its counting a predetermined number of pulses; a third flip-flop having its Q-output connected to the direct-clear input of said first flip-flop, said third flip-flop having its set input connected to said pulse counter to receive said control pulse and to be set thereby, whereby to prevent resetting said first flip-flop after said control pulse is generated; reset means operable to reset each said flip-flop simultaneously and set means operable to set said first flip-flop.

6. The invention of claim 5, wherein said pulse counter is responsive to P-output of said second flip-flop to reset to a predetermined value the count of said pulse counter.

7. The invention of claim 5, wherein said set and reset means is switch means operable to a set condition and, alternately to a reset condition, and being constructed and arranged such that it is possible for said switch means to be in its set condition when said control signal is generated.

8. In combination, utilization means requiring $n$ whole pulses for actuation, a generator of whole pulses, a counter responsive to pulses to count same, gate means for gating said whole pulses to said counter for counting thereby, and to said utilization means; enabling means connected to receive said whole pulses, and to said gate means; said enabling means being responsive to the trailing edge of the first pulse received thereby to enable said gate means.

9. The invention of claim 8, wherein said counter is responsive to counting $n$ pulses to produce a control signal upon counting the $n$th of said pulses, and disabling means connected to receive said control signal, and to said gate means; said disabling means being responsive to said control signal to disable said gate means.

10. The invention of claim 9, wherein said enabling means is a flip-flop having its P-output connected to said gate means for enabling same when said flip-flop is set, said disabling means being connected to the direct-clear input of said flip-flop and being responsive to said control signal for making said flip-flop disable said gate means.

11 The invention of claim 9, wherein said first enabling means is a first flip-flop, and said disabling means is a second flip-flop; said second flip-flop having its Q-output connected to the direct-clear input of said first flip-flop, said first flip-flop having its P-output connected to said gate means for enabling same, in response to setting said first flip-flop, set second flip-flop having its set input connected to said counter to be set by said control signal.

12. The invention of claim 9, including a starting flip-flop, wherein said enabling means is connected to the P-output of said starting flip-flop, and also including a stopping flip-flop, said stopping flip-flop having its Q-output connected to said enabling means for allowing same to be enabled by said P-output of said starting flip-flop, said Q-output of said stopping flip-flop being also connected to the direct-clear input of said first flip-flop, and the set input of said stopping flip-flop being connected to said counter to receive said control signal and to be set by said control signal.

13. A control system having a programmed pulse switch, said programmed pulse switch comprising a pulse source having an output at which appears a train of pulses, wherein said train constitutes alternate on-and-off periods of a signal; a pulse counter, and start/stop circuitry, said start/stop circuitry being actuable to a start condition and, alternately to a stop condition, said circuitry, upon actuation to said start condition, being responsive solely to an ending on-period of said signal to apply said signal, in its next following off-period, to said pulse counter; said pulse counter being responsive to said signal to count pulses in the form of on-periods of said signal applied thereto immediately following said off-period, said pulse counter being settable to produce a control signal upon counting an arbitrary predetermined number of the last said pulses; said start/stop circuitry being responsive to said control signal to prevent the on-period of signal next following the last of said predetermined number of pulses from being counted by said pulse counter;

said programmed pulse switch being combined with pulse-actuated motive means of said control system for controlling a process with respect to a predetermined control point, said motive means being constructed and arranged for changing said control point in response to pulses of signal applied to said motive means, and in proportion to the number of said pulses applied to said motive means; said start/stop circuitry of said programmed pulse switch being arranged to apply the pulses applied to said pulse counter to said motive means, and to prevent pulses from being applied thereto when in its said stop condition;

there being a pair of channels via which said pulses applied to said pulse counter are also applied to said motive means under control of said start/stop circuitry, and means for selecting one or the other only of said channels for applying the last said pulses to said motive means, said motive means being constructed and arranged to change said control point in a sense corresponding to the channel via which pulses are applied to said motive means.

14. The invention of claim 1, wherein one of said channels is arranged to cause the pulses applied via it to said motive means to have a sense opposite to the sense of pulses applied via the other of said channels to said motive means, whereby said motive means changes said control point in a sense corresponding to the pulses applied to said motive means.